United States Patent [19]

Juri et al.

[11] Patent Number: 5,175,631
[45] Date of Patent: Dec. 29, 1992

[54] APPARATUS FOR RECORDING AND REPRODUCING A DIGITAL VIDEO SIGNAL IN THE FORM OF ORDER-REARRANGED AND CODED DATA

[75] Inventors: Tatsuro Juri, Osaka; Masakazu Nishino, Kashiwara; Hideki Ohtaka, Neyagawa; Kouji Matsushita, Oe, all of Japan

[73] Assignee: Matsushita Electric Industrial Co., Ltd., Osaka, Japan

[21] Appl. No.: 567,293

[22] Filed: Aug. 14, 1990

[51] Int. Cl.⁵ .............................................. H04N 5/76
[52] U.S. Cl. ..................................... 358/335; 358/310; 358/133; 360/33.1
[58] Field of Search ............... 358/310, 335, 133, 134, 358/135, 328, 334, 312; 360/33.1, 32

[56] References Cited

U.S. PATENT DOCUMENTS

4,894,713  1/1990  Delogne et al. ..................... 358/136
5,032,927  7/1991  Watanabe et al. .................. 358/335

Primary Examiner—Tommy P. Chin
Assistant Examiner—Huy Nguyen
Attorney, Agent, or Firm—Wenderoth, Lind & Ponack

[57] ABSTRACT

A video signal digital recording and reproducing apparatus includes: a rearranging section for rearranging a sequence of signals on a rectangular unit by rectangular unit basis formed by sectioning a group of pixel data on a screen of a digital video signal; an encoding section for subjecting the signals in the rectangular units to bit rate reduction; a block forming section for gathering plural number of the coded rectangular units to constitute a block of signals, and a recording the block of signals section for recording on a recording medium. The rearranging section divides the screen into plural regions, takes out the rectangular units by a certain number in order from each region, and carries out rearrangement so that mutually corresponding rectangular units which are contained respectively in adjacent blocks on the recording medium are mutually adjacent on the screen. The recording section is constituted so that the blocks signals are recorded simultaneously in parallel on the recording medium by using plural channels. The rearranging section may have such a constitution that the screen is divided into plural regions and the rectangular units are taken out by a certain number in order from each region, and rearrangement is carried out to that mutually corresponding rectangular units which are contained respectively in adjacent or neighboring blocks to be simultaneously recorded in parallel by the plural channels on the recording section are mutually adjacent on the screen.

5 Claims, 9 Drawing Sheets

APPARATUS FOR RECORDING AND REPRODUCING A DIGITAL VIDEO SIGNAL IN THE FORM OF ORDER-REARRANGED AND CODED DATA

BACKGROUND OF THE INVENTION

1. Field of the Invention

The present invention relates to a video signal digital recording and reproducing apparatus for recording or reproducing a digital video signal on a recording medium using a bit rate reduction method.

2. Description of the Prior Art

As a conventional video signal digital recording and reproducing apparatus, there is for example a rotary head type digital VCR for directly recording pixel data without providing any bit rate reduction.

Figure 8:
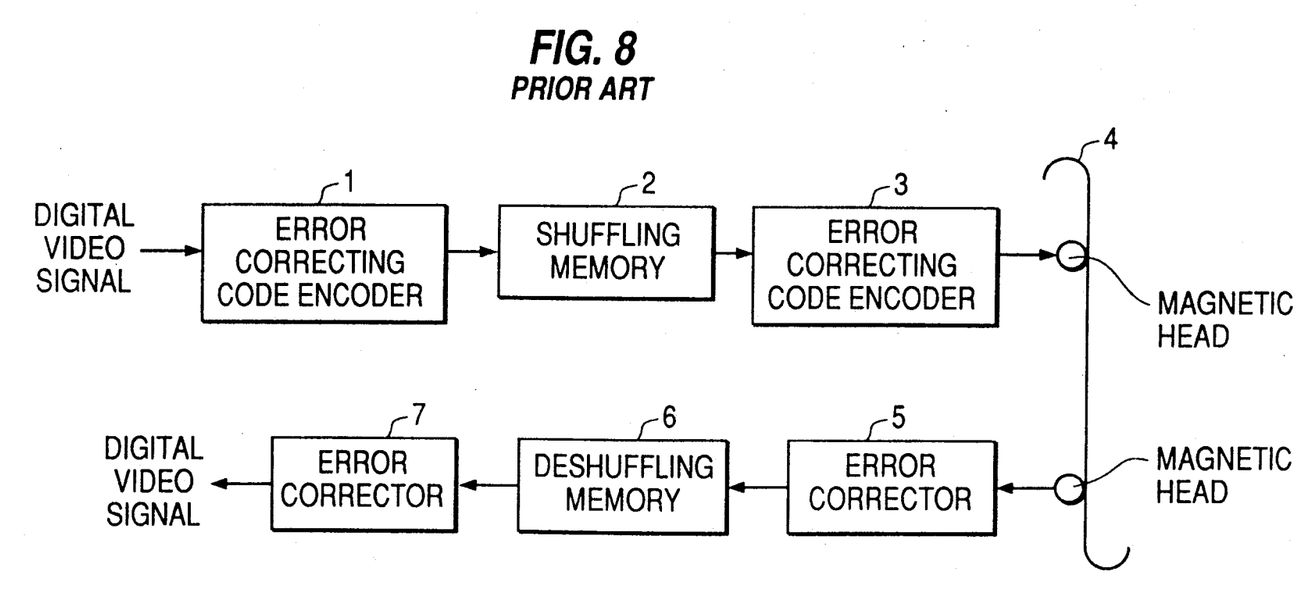
FIG. 8 is a block diagram of a conventional video signal digital recording and reproducing apparatus.
Figure 9:
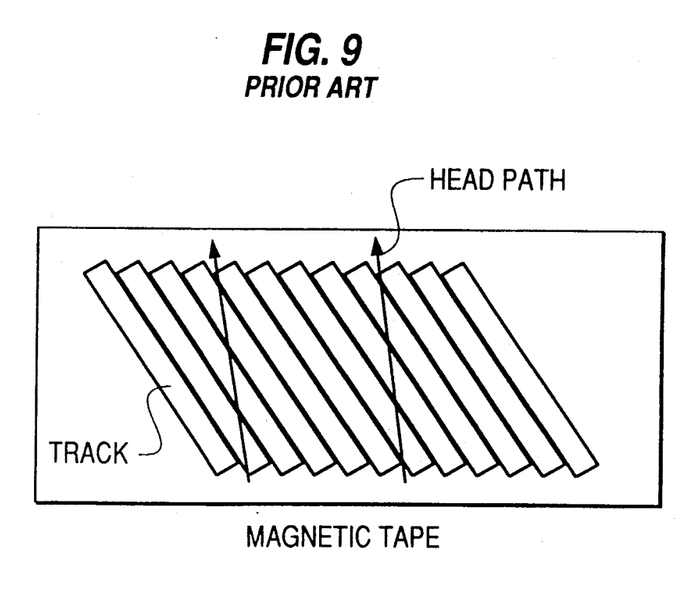
FIG. 9 is a tape pattern diagram in a conventional high speed reproduction mode.

FIG. 8 shows a block diagram of a conventional video signal digital recording and reproducing apparatus. In FIG. 8, element is a first error correcting code encoder; element 2 is a shuffling memory; element 3 is a second error correcting code encoder; element 4 is a magnetic tape, 5 is a second error corrector, 6 is a deshuffling memory, and element 7 is a first error corrector. A digital video signal is inputted to the first error correcting code encoder 1, and, with addition of an error correction code, written in the shuffling memory 2. In the reading out of the shuffling memory 2, the digital video signals are read out at random on a pixel by pixel basis with a change of the order of the digital video signals. The read out signals are once again provided with error correction codes based on the sequence of the rearranged pixel data by the second error correcting code encoder 3 and recorded via a magnetic head on the magnetic tape 4. In reproducing, the signals reproduced from tape 4 via a magnetic head are subjected to a correction of errors by the second error corrector 5 and written in the deshuffling memory 6. In the deshuffling memory 6, rearrangement of pixel data is carried out in reverse order to the rearrangement of pixel data in the shuffling memory 2 in recording to reinstate the sequence of the pixels to their original state. Thereafter, the reproduced signal is again subjected to error correction with the first error corrector 7 and outputted as a digital video signal. In this case, the reason for rearranging the sequence of the pixels is not only to obtain the efficiency of error correction but also to make the image in a high speed reproduction mode easily observed with a digital VCR. In the high speed reproduction mode of a digital VCR, the head on the rotary drum traverses obliquely to the tracks recorded on the tape, as shown in FIG. 9. Accordingly, the detectable signals are on the skipped places against the recorded patterns. In a digital VCR, a high speed reproduced picture is to be constituted by using only the pixel data which has been detected. In such a case, there is an effect that, when shuffling is in effect, the detected pixels are scattered over the whole screen, and no unnatural discontinued section appears on the screen.

Figure 10:
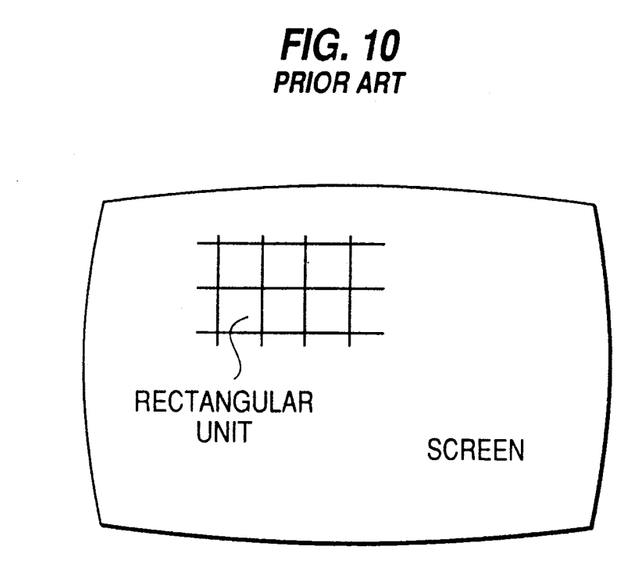
FIG. 10 is a screen view for explaining the rectangle unit.

However, when a digital VCR using bit rate reduction is considered, compression of information is carried out by a method such that, as shown in FIG. 10, the pixels on the screen are sectioned in rectangular shapes, each rectangular unit is subjected to orthogonal transformation and then to variable length coding, and information of a certain number of rectangular units are gathered to form a block of fixed length. However, when these rectangular units are shuffled to carry out digital recording, different from the shuffling on a pixel by pixel basis, the screen images in a high speed reproduction mode become mosaic shaped to show a state which is very difficult to observe. On the contrary, when the video information in rectangular units is recorded in the original sequence without shuffling, the rectangular units in each fixed length block lie on the positions adjacent to one another on the screen, by which a deviation of in the amount of information occurs so as to cause a problem in that the effect of high efficiency coding is diminished.

In view of the abovementioned points, the present invention has its object to provide a video signal digital recording and reproducing apparatus which satisfies both the easiness to observe video images in a high speed reproduction mode and the efficiency of bit rate reduction.

SUMMARY OF THE INVENTION

An object of the present invention is to rearrange of the video signals in digital form so that plural rectangular units in a fixed length block are not gathered on a part thereof to secure the efficiency of bit rate reduction, and yet to so that the mutually corresponding units which are contained in adjacent or neighboring blocks respectively on the recording medium are positioned on the adjacent positions on the screen alike, so that, even in the high speed reproduction mode of the digital VCR, the screen display does not become mosaic form but wide screen regions are always simultaneously reproduced.

In an aspect of the invention, there is provided a digital video signal recording apparatus comprising:

a formatting means for formatting an input digital video signal into a plurality of sequentially arranged rectangular unit data each being a group of a predetermined number of picture element data constituting an image in a corresponding one of a plurality of equally divided rectangular areas of a display screen;

a rearranging means for dividing the plurality of sequentially arranged rectangular unit data into a plurality of groups each constituting an image in one of a plurality of equally divided regions of the display screen, and for rearranging the plurality of sequentially arranged rectangular unit data into a plurality of blocks of rearranged rectangular unit data such that each block is formed by a plurality of sets of rectangular unit data which sets are respectively taken from the plurality of groups of the rectangular unit data and that each adjacent two blocks contain at corresponding positions therein sets of rectangular unit data constituting images which are adjacent to each other on the display screen' an encoding means for encoding each of the rearranged rectangular unit data into a rectangular unit code to obtain a plurality of blocks of rectangular unit codes;

a block forming means for forming the plurality blocks of rectangular unit codes respectively into a plurality of fixed length blocks of rectangular unit codes such that each adjacent two fixed length blocks of the plurality of fixed length blocks contain at corresponding positions therein rectangular unit codes corresponding to images in rectangular areas which are adjacent to each other on the display screen; and a recording means for recording the plurality of fixed length blocks on a recording medium such that said each adjacent two fixed length blocks are recorded adjacent to each other on the recording medium.

In another aspect of the invention, there is provided a digital video signal recording and reproducing apparatus comprising:

a formatting means for formatting an input digital video signal into a plurality of sequentially arranged rectangular unit data each being a group of a predetermined number of picture element data constituting an image in a corresponding one of a plurality of equally divided rectangular areas of a display screen;

a rearranging means for dividing the plurality of sequentially arranged rectangular unit data into a plurality of groups each constituting an image in one of a plurality of equally divided regions of the display screen, and for rearranging the plurality of sequentially arranged rectangular unit data into a plurality of blocks of rearranged rectangular unit data such that each block is formed by a plurality of sets of rectangular unit data which sets are respectively taken from the plurality of groups of the rectangular unit data and that each adjacent two blocks contain at corresponding positions therein sets of rectangular unit data constituting images which are adjacent to each other on the display screen;

an encoding menas for encoding each of the rearranged rectangular unit data into a rectangular unit code to obtain a plurality of blocks of rectangular unit codes;

a block forming means for forming the plurality of blocks of rectangular unit codes respectively into a plurality of fixed length blocks of rectangular unit codes such that each adjacent two fixed length blocks of the plurality of fixed length blocks contain at corresponding positions therein rectangular unit codes corresponding to images in rectangular areas which are adjacent to each other on the display screen; a recording and reproducing means for recording the plurality of fixed length blocks on a recording medium such that said each adjacent two fixed length blocks are recorded adjacent to each other on the recording medium, and for reproducing the recorded fixed length blocks from the recording medium;

a decoding means for decoding each of reproduced rectangular unit codes to obtain a plurality of reproduced rectangular unit data;

an inverse rearranging means for rearranging the plurality of reproduced rectangular unit data in an inverse order to that of said rearranging means to obtain a plurality of sequentially arranged reproduced rectangular unit data; and a deformatting means for deformatting the plurality of sequentially arranged reproduced rectangular unit data into a plurality of sequentially arranged pixel data to thereby obtain a reproduced digital video signal.

BRIEF DESCRIPTION OF THE DRAWINGS

FIGS. 4(Y), 4(C1), and 4(C2) are illustrative views showing a method of block formation of the brightness signal and the chrominance difference signal in accordance with the first embodiment of the present invention;

DESCRIPTION OF THE PREFERRED EMBODIMENTS

Figure 1:
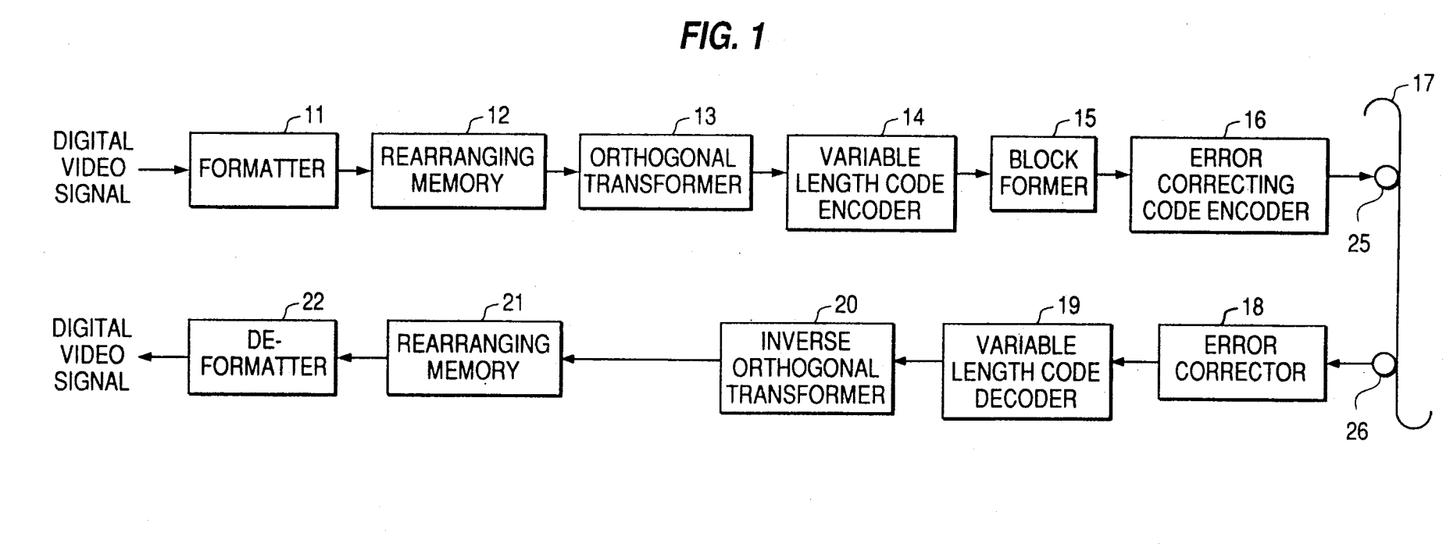
FIG. 1 is a block diagram of a video signal digital recording/reproducing apparatus in accordance with the first embodiment of the present invention.

FIG. 1 shows a block diagram of the video signal digital recording and reproducing apparatus in accordance with the first embodiment of the present invention. This embodiment deals with a rotary head type digital VCR for dividing the screen into rectangular units for bit rate reduction and recording the coded signals on a magnetic tape.

In FIG. 1, element 11 is a formatter element 12 is a rearranging memory element 13 is an orthogonal transformer element 14 is a variable length code encoder element 15 is a block former, 16 an error correcting code encoder element 17 is a magnetic tape, 18 an error corrector element 19 is a variable length code decoder element 20 is an inverse orthogonal transformer element 21 is a rearranging memory, element 22 is a deformatter, and elements 25 and 26 are magnetic heads.

With respect to the video signal digital recording and reproducing apparatus of this embodiment constituted as above, the operation thereof is explained below.

Figure 2:
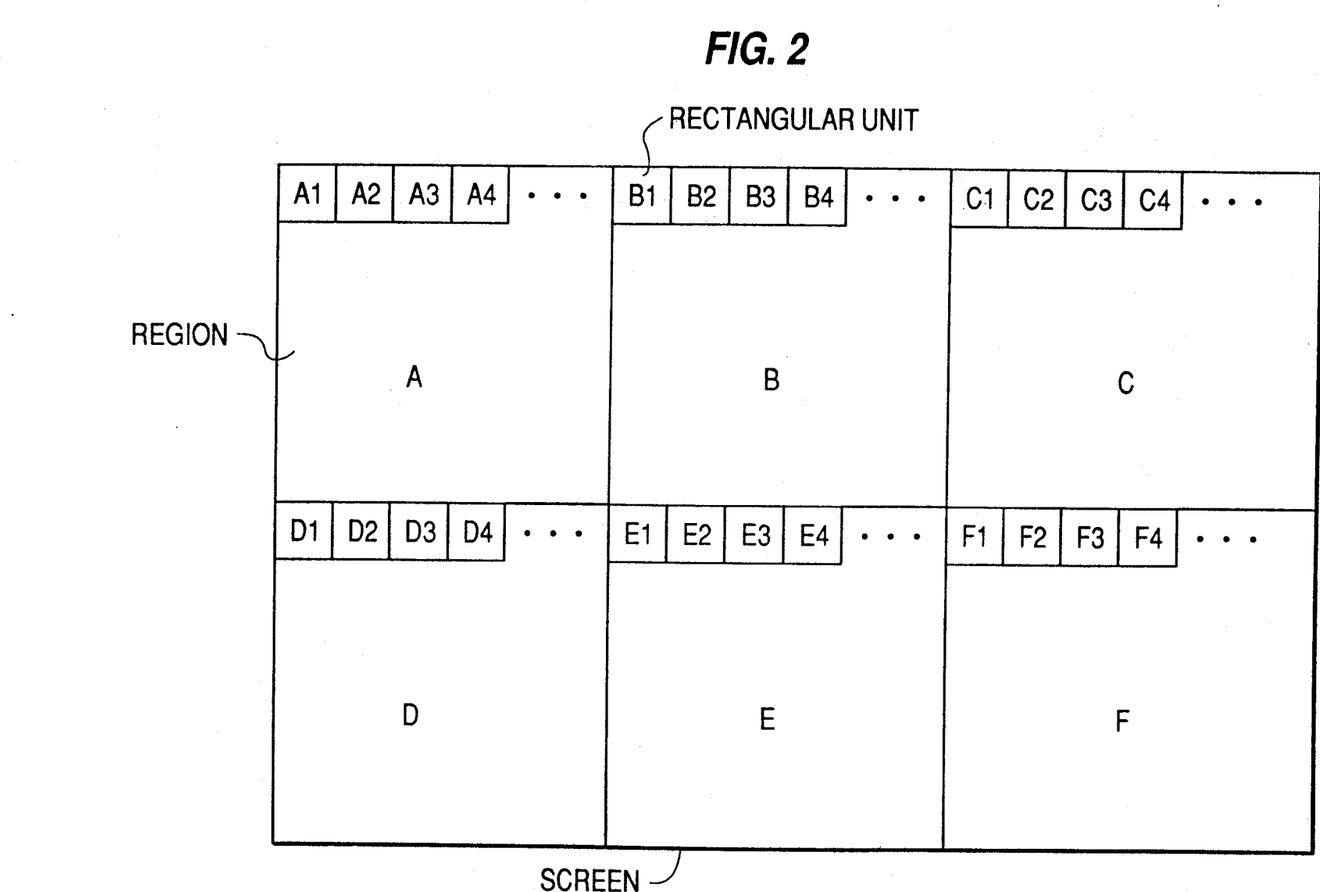
FIG. 2 is an illustrative view showing a state of the screen dividing method in accordance with the first embodiment of the present invention.

In recording, the digital video signals are so arranged that the picture element data are formatted on the screen in rectangular units by the formatter 11, and inputted to the rearranging memory 12. FIG. 2 is a view showing a method of dividing the rectangular units on the screen. In the present embodiment, as shown in FIG. 2, the screen is divided into 6 regions, which are to be called A, B, C, D, E, and F, respectively. Each region is further divided into rectangular units, and the rectangular units in each region are provided with numbers such as A1, A2, A3, ... as shown in the figure. In the rearranging memory 12, the video signals are rearranged so that two continuous rectangular units are taken out in order from each region such as A1, A2, B1, B2, ... F1, F2, and further A3, A4, B3, B4, ... The video signals in each rectangular unit are inputted to the orthogonal transformer 13, where they are subjected to orthogonal transformation and transforming by using a Hadamard transformation or a discrete cosine transformation, after which they are subjected to variable length coding according to the amount of information in each rectangular unit in the variable length code encoder 14. In the variable length coding, the amount of data is determined according to the size of the information in rectangular unit, and bit rate reduction is carried out by curtailing the data amount as a whole. The orthogonal transformation is a means for that purpose. Although the code length of the information in each rectangular unit is variable, in the block former 15, a plurality of rectangular unit information is gathered to form a fixed length block. In the present embodiment, one fixed length block is formed by 12 rectangular units of A1, A2, B1, B2, ... F1, F2, and another fixed length block is formed by 12 rectangular units of A3, A4, B3, B4, ... F3, F4. The same block forming is applied to the remaining blocks.

Figure 3:
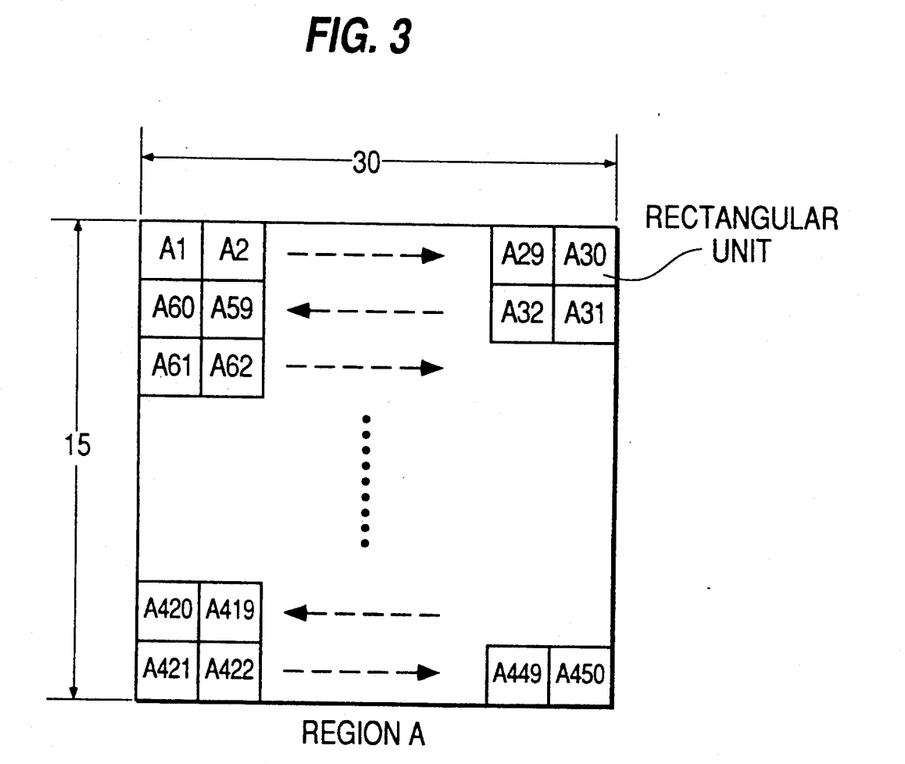
FIG. 3 is an illustrative view showing a method of taking out the rectangular units.

By constituting as above, the position of each rectangular unit in one block on the screen is such that each of the adjacent two rectangular units is separated from the other, but mutually corresponding rectangular units in the adjacent blocks are to be in adjacent positions on the screen. Accordingly, with respect to each fixed length block, the information amount is less apt to become unbalanced, and accordingly the efficiency of the variable length coding can be improved. Here, referring to the method of taking out the rectangular units, for example, in case of taking out 30 rectangular units in the horizontal direction and 15 rectangular units in the vertical direction from the region A, a method as shown in FIG. 3 is one example thereof, by which continuity of the screen can be realized in the region. With respect to other regions, the rectangular units can be taken out in the similar method, and also an operation to differentiate the foremost position of taking out depending on region is possible. With respect to the point that to keep the continuity of the position on the screen between the adjacent fixed length blocks leads to secure the easiness to see the screen, an explanation will be given later.

Finally, the block-formed data are additionally provided with an error correcting code by the error correcting code encoder 16 and subjected to digital recording on the magnetic tape 17 via a magnetic head 25.

In reproducing, the digital signal is detected via a magnetic head 26 from the magnetic tape 17, and the errors caused by the tape-head interface are corrected by the error corrector 18. As the recorded signals are subjected to variable length coding, the compressed codes are uncompressed by the variable length code decoder 19. The decoded signals are reconstituted into the digital video signal by the inverse orthogonal transformer 20. Since at this point the signals are rearranged on the basis of the rectangular units, the input and output addresses of the memory are controlled to make the rearranging of the data reverse to the recording side by the rearranging memory 21. The rearranged signals are outputted as reproduced digital signals in the same order of sequence as that of the video signals by the deformatter 22.

Figure 7:
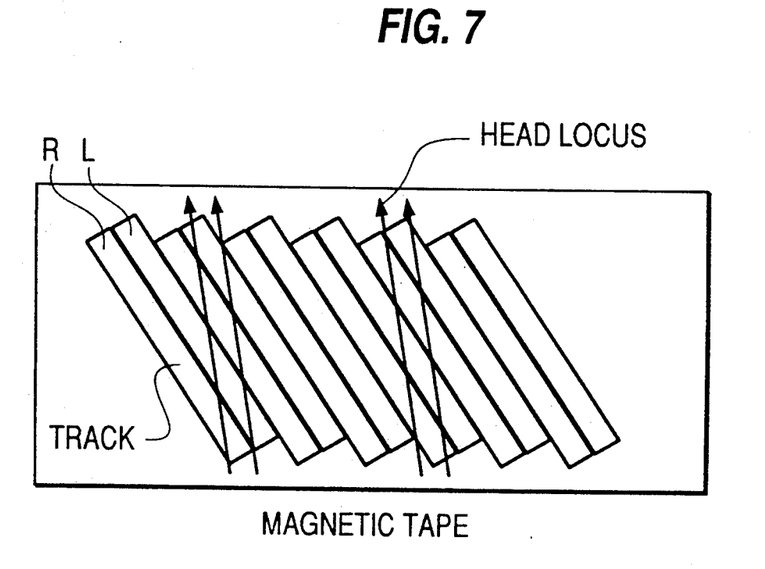
FIG. 7 is a tape pattern diagram during the high speed reproduction in mode in accordance with the second embodiment of the present invention.

In the high speed reproduction mode in a digital VCR as in this embodiment, the head shifts over a plurality of tracks on the tape, as shown in FIG. 7. Since the data is continuously recorded in block units on each track, the signals can be caught continuously to some extent even during the high speed reproduction mode. In this embodiment, since the corresponding two rectangular units which are respectively contained in the continued two blocks are on the continued positions even on the screen, even during the high speed reproduction mode, continuity of screen can be realized to some extent, and mosaic formation of the screen in rectangular unit can be avoided.

As described above, according to this embodiment, since the plural rectangular units contained in one fixed length block are on mutually separated positions on the screen by the adjacent two rectangular units, there is less tendency for the amount of information in each fixed length block to cause deviation when the rectangular units are subjected to variable length coding, thereby leading to an improvement in the efficiency of compression. Furthermore, the mutually corresponding four rectangular units contained respectively in the adjacent two blocks on the recording medium are to be adjacent to the screen, by which continuity of screen can be secured even during the high speed reproduction of digital VCR and a high speed reproduced picture which is visually easy to see can be obtained.

Although, in this embodiment, each two adjacent rectangular units are taken out from one region, the number of the rectangular units to be taken out is not particularly specified but freely selectable.

Figure 4:
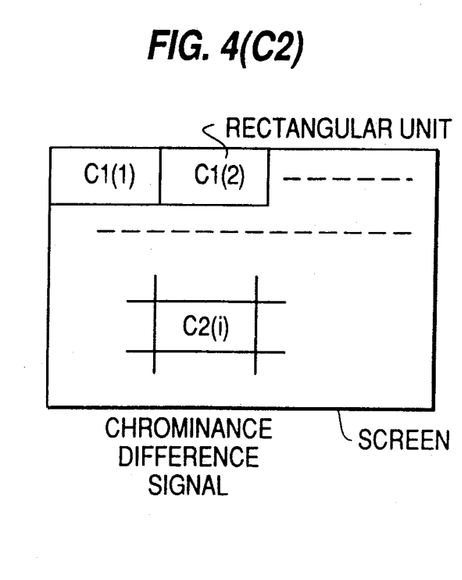
Figure 4Y:
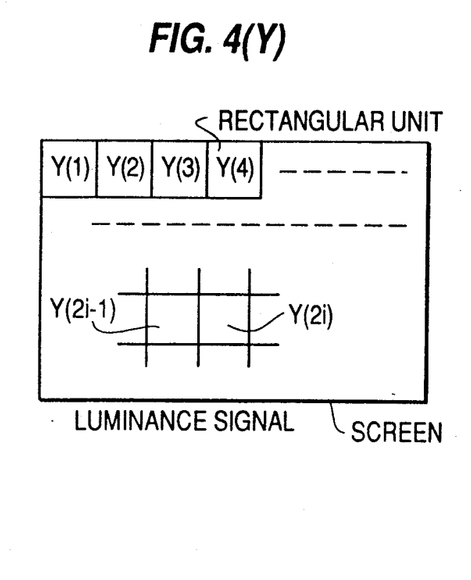

Next, FIGS. 4(Y), 4(C1) and 4(C2) are views for illustrating the method of block forming the luminance signal and the chrominance difference signal. In FIGS. 4(Y), 4(C1) and 4(C2), each of the luminance signal (Y) and two kinds of chrominance difference signals (C1, C2) is divided into rectangular units. Here, the number of pixels in a horizontal line of the chrominance difference signal is half that of the luminance signal, and the number of pixels contained in one rectangular unit is the same for both the luminance signal and the chrominance difference signal. Accordingly, for example in FIG. 4, the four rectangular units shown by Y(1), Y(2), C1(1) and Y($2i-1$), Y($2i$), C1($i$), C2($i$) are the rectangle units which are on the same position on the screen. That is to say, block formation is carried out so that the rectangular units of one each chrominance difference signal [C1($i$), C2($i$)] and the rectangular units of the continued two luminance signals [Y($2i-1$), Y($2i$)] are contained in the same block.

By constituting the block formation of the luminance signals and the chrominance difference signals in the above manner, due to the existence of the luminance signals and the chrominance difference signals which are on the same position on the screen in the block read out in reproducing, the luminance signals and the chrominance difference signals which are on the same position on the screen can be simultaneously reproduced to give improvement in the quality of the screen display in reproduction. Although in FIGS. 4(Y), 4(C1) and 4(C2), there is exemplified the case where the number of the pixels in a horizontal line of the chrominance difference signal is half that of the luminance signal, in other cases, e.g., when the number of the pixels in a horizontal line of the chrominance difference signal is ¼ that of the luminance signal or when the number of the horizontal pixels and that of the vertical pixels of the chrominance difference signal are both half those of the luminance signals, four rectangular units of the luminance signal correspond to one rectangular unit of the chrominance difference signal.

Figure 5:
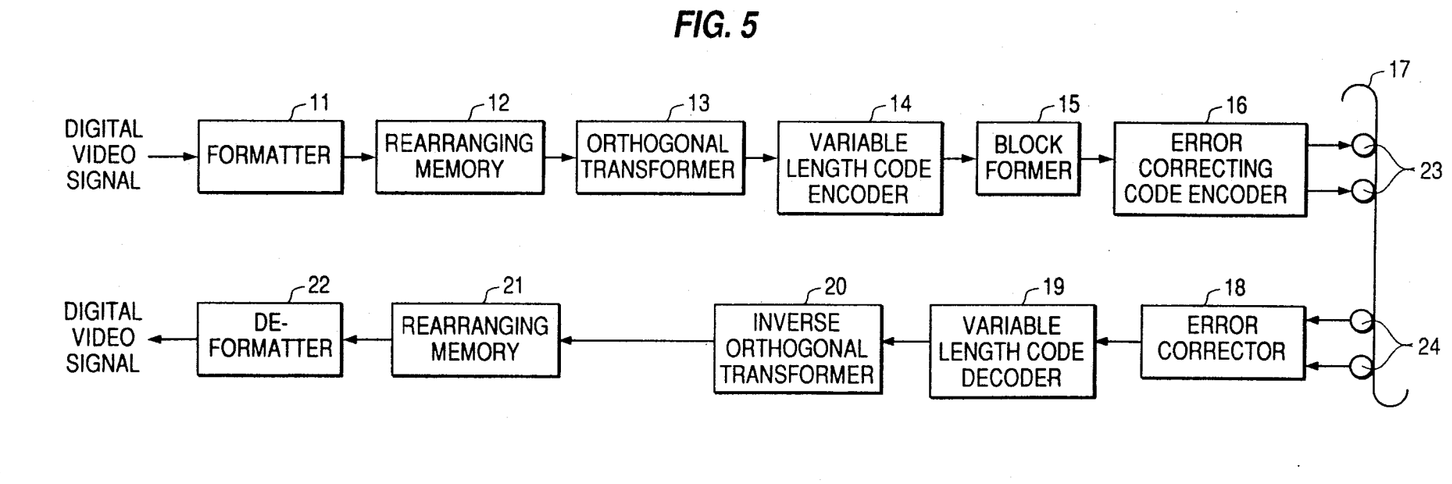
FIG. 5 is a block diagram of the video signal digital recording and reproducing apparatus in accordance with the second embodiment of the present invention.

FIG. 5 is a block diagram of the video signal digital recording and reproducing apparatus in accordance with the second embodiment of the present invention. This embodiment relates to a rotary head type digital VCR for recording and reproducing signals on a magnetic tape by subjecting the screen in rectangular units to bit rate reduction, as in the abovementioned first embodiment.

In FIG. 5, the respective elements 11 to 22 are the same as those of the abovementioned first embodiment, so that the explanation thereon is omitted. Those elements which are different from those of the first embodiment are the recording heads 23 and the reproducing heads 24. There are provided two recording heads 23 and two reproducing heads 24, and the two channel portions thereof are simultaneously recorded and reproduced in parallel on the magnetic tape.

With respect to the video signal digital recording and reproducing apparatus of this embodiment constituted as above, the operation thereof is explained below.

Figure 6:
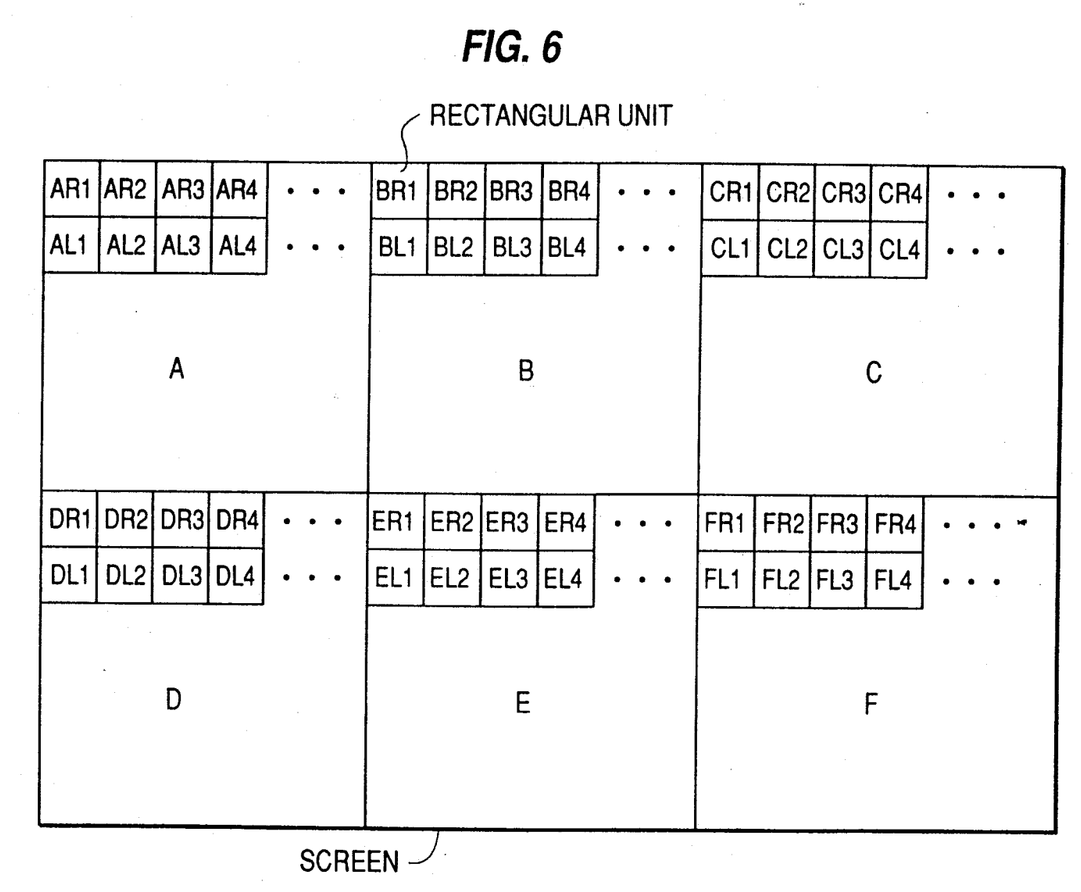
FIG. 6 is an illustrative view showing a method of dividing the screen in accordance with the first embodiment of the present invention.

In recording, the digital video signals are so arranged that the pixel data are formatted on the screen in rectangular units by the formatter 11, and inputted to the rearranging memory 12. FIG. 6 is a view showing a method of dividing the rectangular units on the screen. In this embodiment, as shown in FIG. 6, the screen is divided into 6 regions, which are to be called A, B, C, D, E, and F, respectively. Each region is further divided into rectangular units, and the rectangular units in each region are provided with numbers AR1, AL1, AR2, AL2, ... as in the figure. In the rearranging memory 12, the video signals are rearranged on a rectangular unit by rectangular unit basis so that two continuous rectangular units are taken out in order from each region such as AR1, AR2, BR1, BR2, ... FR1, FR2, also AL1, AL2, BL1, BL2, ... FL1, FL2, and further AR3, AR4, BR3, BR4, ..., and the like. The video signals in each rectangular unit are inputted to the orthogonal transformer 13, where they are subjected to orthogonal transformation using a Hadamard transformation or a discrete cosine transformation, and after which they are subjected to variable length coding according to the amount of information in each rectangular unit in the variable length code encoder 14. In the variable length coding, the amount of data is determined according to the size of the information in rectangular unit, and bit rate reduction is carried out by curtailing the amount of data as a whole. Although the code length of the information in each rectangular unit is variable, in the block former 15, a plural number of rectangular unit information is gathered to form a fixed length block. In this embodiment, there is adopted a method where one fixed length block is formed by 12 rectangular units of AR1, AR2, BR1, BR2, ... FR1, FR2, and another fixed length block is formed by 12 rectangular units of AL1, AL2, BL1, BL2, ... FL1, FL2. In the above significance, R and L represent the channel identifications to the recording heads and the reproducing heads which are provided in two channels respectively, and each numeral represents the number of the blocks to be recorded on each channel.

By constituting as above, the position of each rectangular unit in one block on the screen is such that each of the adjacent two rectangular units is separated from the other, but between the blocks of the channels which are simultaneously recorded in parallel on the tape, mutually corresponding rectangular units in the adjacent blocks are to be in adjacent positions on the screen. Accordingly, with respect to each fixed length block, the amount of information is less apt to become unbalanced, and accordingly the efficiency of the variable length coding can be improved.

The block formed data are additionally provided with an error correcting code by the error correcting code encoder 16 and recorded in digital form on the magnetic tape 17. At this time, the data corresponding to two fixed length blocks (blocks identified by the abovementioned R and L) are simultaneously recorded in parallel by the two recording heads 23.

In reproducing, the digital signals are detected simultaneously in parallel from the magnetic tape 17 by using two reproducing heads 24, and the errors caused by the tape-head interface are corrected by the error corrector 18. Since the recorded signals are subjected to variable length coding, the compressed codes are decompressed by the variable length code decoder 19. The decoded signals are reconstituted into the digital video signals by the inverse orthogonal transformer 20. Since at this point the signals are rearranged on the basis of the rectangular units, the input and output addresses of the memory are controlled to make the rearrangement of the data reverse to the recording side by the rearranging memory 21. The rearranged signals are outputted as reproduced digital signals in the same order of sequence as that of the video signals by the deformatter 22.

In the high speed reproduction mode in the digital VCR of a type for recording two channels simultaneously as in this embodiment, an example of the relationship between the track recorded on the tape and the locus through which the two reproducing heads 24 pass is shown in FIG. 7. In the high speed reproduction mode, the two reproducing heads 24 on the rotary drum obliquely transverse a plurality of tracks simultaneously. Here, as the blocks constituted mutually by the adjacent rectangular units on the screen are recorded on two tracks recorded simultaneously by the two recording heads 23 in recording (e.g., R and L in the said figure), when the reproducing heads 24 transverse the two tracks (R and L), the blocks constituted mutually by the adjacent rectangular units on the screen are always simultaneously detected and reproduced. Accordingly, according to this embodiment, even in the high speed reproduction mode, the screen region can be reproduced widely and continuously, and mosaic formation of the screen in rectangular units can be avoided.

As described above, according to this embodiment, as the plural rectangular units contained in one fixed length block are on mutually separated positions on the screen by the adjacent two rectangular units, there is less tendency for the amount of information in each fixed length block to cause deviation when the rectangular units are subjected to variable lenth coding, thereby leading to an improvement in the efficiency of compression. Furthermore, since the adjacent rectangular units on the screen are always contained between the blocks lying on the two blocks which are simultaneously recorded and reproduced in parallel, continuity of picture on the screen can be secured even during the high speed reproduction mode, and a high speed reproduced picture which is visually easy to see can be obtained.

In this embodiment also, the number of rectangular units to be taken out from one region can be freely selected as in the first embodiment.

Also, in the case of the simultaneous recording and reproducing of the plural channels as in this embodiment, the abovementioned method in relation to the block formation of the luminance signal and the chrominance difference signal is effective. By performing the block formation so that the luminance signals and the chrominance difference signals lying on the same position on the screen exist in the blocks which are simultaneously recorded and reproduced in parallel by the plural channels, the luminance signals and the chrominance difference signals lying on the same position on the screen can be simultaneously reproduced in high speed reproduction to give improvement in the quality of the screen display in reproduction.

Further, in this embodiment, a constitution of simultaneous recording and reproducing of two channels has been shown. However, the larger the number of channels is, the more the continuity of the picture on the screen in the high speed reproduction mode is obtained to give greater effect. Also, as in the abovementioned first embodiment, by continuously recording the fixed length blocks in the order of the block numbers as in FIG. 6 even in the same channel, i.e., in the same track on the tape, continuity of the screen is improved to give further effect.

Furthermore, in the first and the second embodiments, orthogonal transformation is used as the compression means, but other means may be applied for coding the screen in rectangular unit. Although a rotary head type digital VCR has been described, a disk form may be usable.

As described above, according to the present invention, both the efficiency of the bit rate reduction of the video signal and the screen display quality in high speed reproduction from the recording medium can be simultaneously satisfied, and its practical effect is significant.

What is claimed is:

1. A digital video signal recording apparatus comprising:
   a formatting means for formatting an input digital video signal into a plurality of sequentially arranged rectangular unit data each being a group of a predetermined number of picture element data constituting an image in a corresponding one of a plurality of equally divided rectangular areas of a display screen;
   a rearranging means for dividing the plurality of sequentially arranged rectangular unit data into a plurality of groups each constituting an image in one of a plurality of equally divided regions of the display screen, and for rearranging the plurality of sequentially arranged rectangular unit data into a plurality of blocks of rearranged rectangular unit data such that each block is formed by a plurality of sets of rectangular unit data which sets are respectively taken from the plurality of groups of the rectangular unit data and that each adjacent two blocks contain at corresponding positions therein sets of rectangular unit data constituting images which are adjacent to each other on the display screen;
   an encoding means for encoding each of the rearranged rectangular unit data into a rectangular unit code to obtain a plurality of blocks of rectangular unit codes;
   a block forming means for forming the plurality blocks of rectangular unit codes respectively into a plurality of fixed length blocks of rectangular unit codes such that each adjacent two fixed length blocks of the plurality of fixed length blocks contain at corresponding positions therein rectangular unit codes corresponding to images in rectangular areas which are adjacent to each other on the display screen; and
   a recording means for recording the plurality of fixed length blocks on a recording medium such that said each adjacent two fixed length blocks are recorded adjacent to each other on the recording medium.

2. An apparatus according to claim 1, wherein said each of the plurality of sets of rectangular unit data is formed by a predetermined number of continuous rectangular unit data of the plurality of sequentially arranged rectangular unit data which constitute images in a predetermined number of continuous rectangular areas on the display screen.

3. An apparatus according to claim 1, wherein said each of the plurality of sets of rectangular unit data is formed by a luminance signal data and two kinds of chrominance difference signal data which constitute a color image in a rectangular areas on the display screen.

4. An apparatus according to claim 1, wherein said recording means comprises a plural-channel recording means for recording a predetermined number of fixed length blocks in parallel on parallel recording tracks of the recording medium such that said each adjacent two fixed length blocks are recorded on recording tracks which are adjacent to each other on the recording medium.

5. A digital video signal recording and reproducing apparatus comprising:
   a formatting means for formatting an input digital video signal into a plurality of sequentially arranged rectangular unit data each being a group of a predetermined number of picture element data constituting an image in a corresponding one of a plurality of equally divided rectangular areas of a display screen;
   a rearranging means for dividing the plurality of sequentially arranged rectangular unit data into a plurality of groups each constituting an image in one of a plurality of equally divided regions of the display screen, and for rearranging the plurality of sequentially arranged rectangular unit data into a plurality of blocks of rearranged rectangular unit data such that each block is formed by a plurality of sets of rectangular unit data which sets are respectively taken from the plurality of groups of the rectangular unit data and that each adjacent two blocks contain at corresponding positions therein sets of rectangular unit data constituting images which are adjacent to each other on the display screen;
   an encoding means for encoding each of the rearranged rectangular unit data into a rectangular unit code to obtain a plurality of blocks of rectangular unit codes;
   a block forming means for forming the plurality blocks of rectangular unit codes respectively into a plurality of fixed length blocks of rectangular unit codes such that each adjacent two fixed length blocks of the plurality of fixed length blocks contain at corresponding positions therein rectangular unit codes corresponding to images in rectangular areas which are adjacent to each other on the display screen;
   a recording and reproducing means for recording the plurality of fixed length blocks on a recording medium such that said each adjacent two fixed length blocks are recorded adjacent to each other on the recording medium, and for reproducing the recorded fixed length blocks from the recording medium;
   a decoding means for decoding each of reproduced rectangular unit codes to obtain a plurality of reproduced rectangular unit data;
   an inverse rearranging means for rearranging the plurality of reproduced rectangular unit data in an inverse order to that of said rearranging means to obtain a plurality of sequentially arranged reproduced rectangular unit data; and
   a deformatting means for deformatting the plurality of sequentially arranged reproduced rectangular unit data into a plurality of sequentially arranged pixel data to thereby obtain a reproduced digital video signal.

* * * * *